United States Patent
Morovic et al.

(10) Patent No.: US 9,584,700 B2
(45) Date of Patent: Feb. 28, 2017

(54) COLOR SEPARATION TABLE OPTIMIZED FOR A PRINTING PROCESS ACCORDING TO A PRINT ATTRIBUTE BY SELECTING PARTICULAR NEUGEBAUER PRIMARIES AND NEUGEBAUER PRIMARY AREA COVERAGES

(75) Inventors: Jan Morovic, Colchester (GB); Peter Morovic, Sant Cugat del Valles Barcelona (ES); Jordi Arnabat Benedicto, L'Arboç Tarragona (ES); Jordi Vilar, Terrassa Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1721 days.

(21) Appl. No.: 12/605,499

(22) Filed: Oct. 26, 2009

(65) Prior Publication Data
US 2011/0096364 A1    Apr. 28, 2011

(51) Int. Cl.
*H04N 1/60* (2006.01)
*H04N 1/52* (2006.01)

(52) U.S. Cl.
CPC .............. *H04N 1/52* (2013.01); *H04N 1/6058* (2013.01); *H04N 1/6019* (2013.01); *H04N 1/6061* (2013.01); *H04N 1/6069* (2013.01)

(58) Field of Classification Search
CPC combination set(s) only.
See application file for complete search history.

(56) References Cited

U.S. PATENT DOCUMENTS

| | | | |
|---|---|---|---|
| 5,416,890 A | 5/1995 | Beretta | |
| 5,450,216 A | 9/1995 | Kasson | |
| H1506 H | 12/1995 | Beretta | |
| 5,553,199 A | 9/1996 | Spaulding et al. | |
| 5,583,666 A | 12/1996 | Ellson et al. | |
| 5,774,238 A * | 6/1998 | Tsukada | 358/529 |
| 5,809,213 A | 9/1998 | Bhattacharjya | |
| 6,229,626 B1 | 5/2001 | Boll | |
| 6,381,361 B1 | 4/2002 | Silverbrook et al. | |
| 6,459,425 B1 | 10/2002 | Holub et al. | |
| 6,480,299 B1 | 11/2002 | Drakopoulos et al. | |
| 6,654,143 B1 | 11/2003 | Dalal et al. | |
| 6,724,500 B1 | 4/2004 | Hains et al. | |
| 6,972,869 B2 | 12/2005 | Harrington | |

(Continued)

FOREIGN PATENT DOCUMENTS

WO    WO 2007137621 A1 *  12/2007

OTHER PUBLICATIONS

U.S. Appl. No. 12/390,214.

(Continued)

*Primary Examiner* — Richard Zhu
(74) *Attorney, Agent, or Firm* — HP Inc—Patent Department (57) ABSTRACT

Method of setting up a color separation table for a specific print system, comprising finding first NP (Neugebauer Primary) area coverages of a specific print system that correspond to color values, adding second NP area coverages by converting halftone data from at least one pre-determined pair of halftone data and corresponding color value to NP area coverages, and generating a color separation table arranged as input for a halftone process that comprises color values linked to the corresponding first and second NP area coverages.

16 Claims, 5 Drawing Sheets

(56) References Cited

U.S. PATENT DOCUMENTS

| | | | |
|---|---|---|---|
| 7,075,643 B2 | 7/2006 | Holub | |
| 7,177,465 B1 | 2/2007 | Takahira | |
| 7,233,413 B2 | 6/2007 | Jones et al. | |
| 7,411,701 B2 | 8/2008 | Boll | |
| 7,421,117 B2 | 9/2008 | Kondo et al. | |
| 7,573,607 B2 * | 8/2009 | Huan et al. | 358/1.9 |
| 7,583,406 B2 * | 9/2009 | Spaulding et al. | 358/1.9 |
| 7,782,490 B2 * | 8/2010 | Mestha et al. | 358/1.9 |
| 7,864,371 B2 * | 1/2011 | Shirasawa | 358/1.9 |
| 8,363,273 B2 * | 1/2013 | Morovic et al. | 358/1.9 |
| 2004/0085326 A1 * | 5/2004 | Agar | 345/589 |
| 2005/0094169 A1 * | 5/2005 | Berns et al. | 358/1.9 |
| 2005/0254073 A1 * | 11/2005 | Braun et al. | 358/1.9 |
| 2006/0193018 A1 * | 8/2006 | Ito et al. | 358/518 |
| 2006/0232806 A1 * | 10/2006 | Holub | 358/1.9 |
| 2006/0285742 A1 * | 12/2006 | Arai et al. | 382/162 |
| 2007/0030505 A1 * | 2/2007 | Ito et al. | 358/1.9 |
| 2007/0086026 A1 * | 4/2007 | Huang et al. | 358/1.9 |
| 2008/0030787 A1 | 2/2008 | McElvain | |
| 2008/0294383 A1 | 11/2008 | Parmar et al. | |
| 2009/0310154 A1 * | 12/2009 | Morovic et al. | 358/1.9 |
| 2010/0085586 A1 * | 4/2010 | Tin | 358/1.9 |
| 2010/0214576 A1 | 8/2010 | Morovic et al. | |

OTHER PUBLICATIONS

C. Bradford Barber, David P. Dobkin and Hannu Huhdanpaa: The Quickhull Algorithm for Convex Hulls; ACM Transactions on Mathematical Software; Dec. 1996; pp. 1-15; vol. 22 No.

K. Schittkowski; NLPQL: A Fortran Subroutine Solving Constrained Nonlinear Programming Problems; Annals of Operations Research; Jun. 1985; pp. 485-500; No. 5; J. C. Baltzer A.G.

* cited by examiner

COLOR SEPARATION TABLE OPTIMIZED FOR A PRINTING PROCESS ACCORDING TO A PRINT ATTRIBUTE BY SELECTING PARTICULAR NEUGEBAUER PRIMARIES AND NEUGEBAUER PRIMARY AREA COVERAGES

BACKGROUND OF THE INVENTION

A color pipeline maps color input values to halftone data for printing. The color input values corresponds to an image or color. The color input values may include a colorimetric value in a color space, for example defined in CIE XYZ or CIE Lab, or a device dependent model such as RGB or CMYK. The color pipeline maps such color input values to halftone data, using color management, color separation, linearization and halftoning. The color pipeline includes a color separation table that specifies the ink vector data corresponding to the color input values. This ink vector data results in a halftone pattern as a result of the predetermined halftoning algorithm.

For setting up such pipeline, a number of halftone patterns is assigned to a number of colors that a certain print system can print, via said color separation, linearization and halftoning. This number of halftone patterns comprises a relatively small set of halftone patterns that is optimal for the specific print system. The assignment can be made on the basis of printed and measured halftone patterns. From the small number of halftone patterns a mapping for the full color gamut is generated.

While this mapping sometimes works well, in most cases non-optimal halftone patterns are assigned to the colors in the gamut. Moreover, for a specific pipeline, a specific mapping method is usually applied. It is however known that in many cases one process may be better suitable for one color range, while another process may be better suitable for another color range. Optimally, different halftoning algorithms are applied.

Sometimes better halftone patterns are known for a specific print system, while the installed system pipeline may not have them incorporated. Such better halftone patterns may be obtained systematically or even manually by trial and error. For example, such halftone patterns have shown to result in optimal ink usage for specific colors, or give better results for other print attributes such as smooth transitions between colors, low cost per copy, high color constancy, and low grain. The better result that is achieved by these optimized halftone patterns is not achieved by the print system having the non-adapted pipeline installed. The same accounts for available optimized ink combinations that achieve good results. These ink combinations may be expressed as halftone pattern. At present, these are also difficult to incorporate in the pipeline.

One way to try to integrate halftone patterns with a print system pipeline is to post-process the halftone patterns by interpolation. A halftone pattern assigned to a chosen color is introduced in the color separation table by replacing the corresponding ink vector and then propagating the corresponding changes to nearby ink vectors in the color separation table. Another known way consists of performing multiple color separations, using one or more color separations for the newly introduced halftone data, and other color separations for other halftone data, and subsequently merging the performed color separations.

However, in both of these methods the color relationship between an ink vector and a corresponding color is non-linear. Also, the relationship between an ink vector and a color depends on each different ink, how these inks overprint and the substrate.

One of the objects of the invention is to better facilitate incorporation of known pairs of halftone patterns and color values in a print system pipeline.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description through modification, combination or variation of certain elements. Furthermore, it may be understood that also embodiments or elements that may not be specifically disclosed may be derived from the description and drawings.

This disclosure describes various exemplary methods and computer products for printing a document in a printing system. In particular, this disclosure describes selecting certain Neugebauer Primaries (NPs) and Neugebauer Primary area coverages (NPacs) to optimize a printing process according to a certain print attribute.

Use of NPs and NPacs is disclosed in co-pending U.S. patent application Ser. No. 12/390,214, filed 20 Feb. 2009, which issued as U.S. Pat. No. 8,213,055, the contents of which are incorporated herein by reference.

In one embodiment, the Neugebauer Primaries are the possible combinations of a set of n inks. Each ink within the set may be at one of k levels for a single halftone pixel, where there are $k^n$ combinations for each ink set defining all of the possible ink configuration states that a single halftone pixel can have. For example, where k=2 for a binary (or bi-level) printer, the printer is able to use either no ink or one drop of ink at a single pixel per ink channel. For example, where n=2 the printer would have two ink channels, for example C and M. The possible combinations would then be White (W), C, M and CM, being $k^n = 2^2 = 4$ possible combinations. For example, for a printer comprising six different inks and the ability to place either 0, 1, or 2 drops of each ink at each halftone pixel, resulting in $3^6$ or 729 NPs. A certain color may correspond to a certain NPac, which may be represented as a vector, wherein [W, C, M, CM]=[a(area) $_W$%, $a_C$%, $a_M$%, $a_{CM}$%], where $a_W$%+$a_C$%+$a_M$%+$a_{CM}$%=100%.

NPacs may be represented by linear, convex combinations of NPs, wherein the relative area coverages over a unit area are the convex weights. An NPac may also represent a single NP, that NP having a 100% area coverage weight and the other NPs being at 0%. According to an embodiment in this disclosure, all of a printing system's NPacs are accessible, so the full color gamut of a printing system can be addressed.

The present disclosure may relate to, as further described in U.S. patent application Ser. No. 12/390,214, printing and measuring up to all of an ink set's Neugebauer primaries (NPs), computing the convex hull of the measurements, tessellating the convex hull using at least the convex hull vertices, and for any color inside the convex hull, finding the enclosing tetrahedron and determining the weights with which the vertices can be combined to give the chosen color, where the weights are the relative area coverages needed for each of the vertex NPs. The present disclosure may further relate to adding second NPacs by converting halftone data to NPacs, wherein the halftone data is taken from at least one pre-determined pair of (i) halftone data and (ii) a corresponding color value, and wherein the NPacs are linked to the respective color value. The halftone data may comprise halftone patterns as described in the introductory part of the description, i.e. halftone data that has been found to give good results for a specific print attribute for a specific print system.

Figure 1:
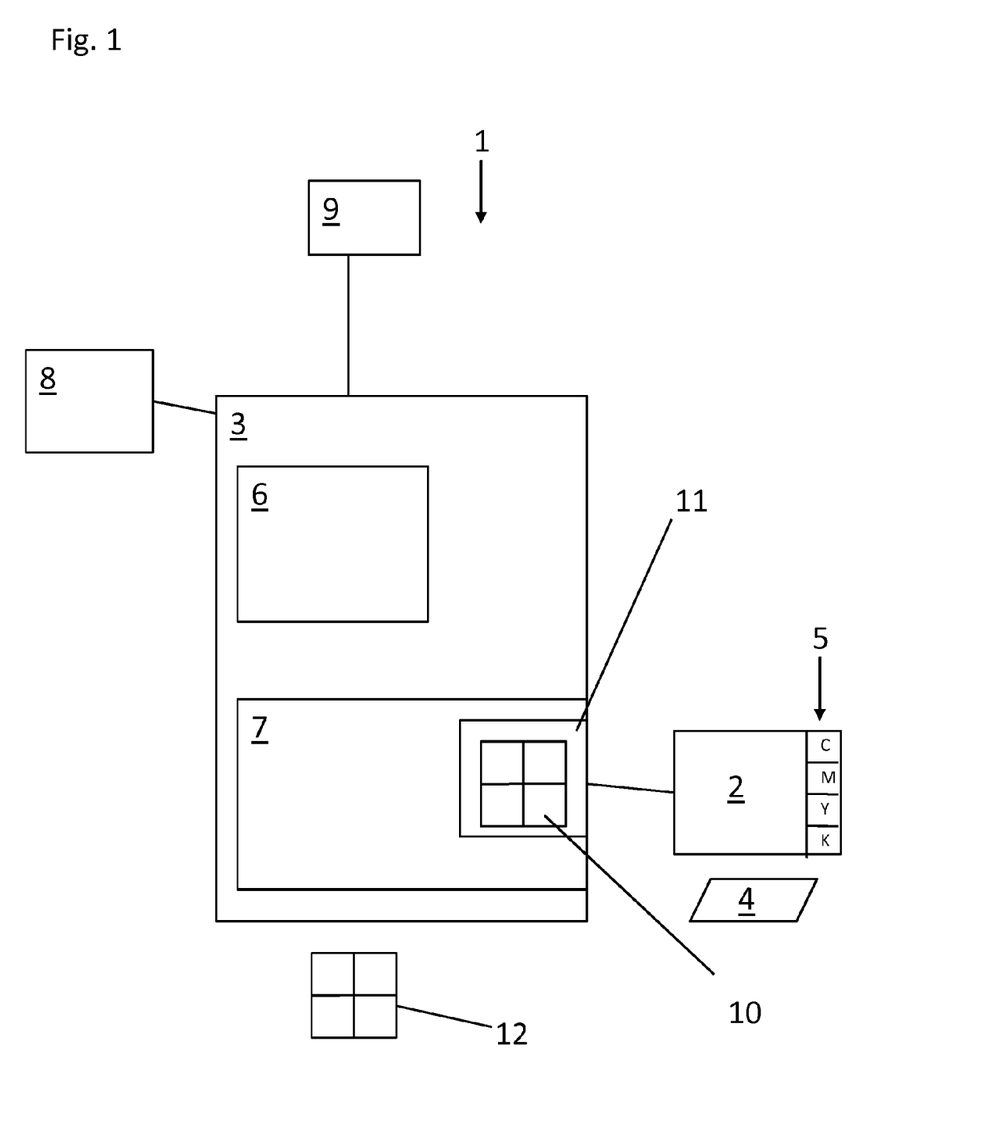
FIG. 1 shows a schematic diagram of a print system.

FIG. 1 illustrates an exemplary printing system 1. The print system 1 may comprise a printer 2 of a predetermined type. Without intending to limit to a specific type of printer 2, the printer 2 may comprise a large or small format printer, a laser printer, an inkjet printer, an offset printer, a digital press, a dot-matrix printer, a line printer, and/or a solid ink printer.

The printing system 1 can be driven, at least in part, by one or more suitable computing devices 3. Computing devices 3 that may be used include, but are not limited to, a personal computer, a laptop computer, a desktop computer, a digital camera, a personal digital assistance device, a cellular phone, a video player, and other types of image sources.

The printer 2 may comprise a print head arranged to print on a substrate 4. The substrate 4 may comprise any type of substrate, for example, but not limited to, paper, films, foils, textiles, fabrics or plastics. The printer 2 may comprise, or be connected to, a certain ink set 5. The ink set 5 may comprise a predetermined number of inks, for example four inks which may be Cyan, Magenta, Yellow and Black (CMYK). The ink set 5 may be determined by the printer 2, wherein different printers 2 correspond to different ink sets 5, or different ink sets 5 may be applied in one printer 2.

The computing device 3 may be physically integrated with or connected to the print system 1. The computing device 3 may be arranged to process image data. The computing device 3 may be arranged to separate and/or convert colors. The computing device 3 may comprise a processing circuit 6 and a storage device 7. The storage device 7 may facilitate any type of computer data storage. The storage device 7 may comprise, but should not be limited to, any type non-volatile memory such as a hard disk, a solid state storage device, a ROM (Read Only Memory), an exchangeable data carrier, etc. The storage device 7 may store data, drivers, and computer programs, amongst others.

For example, an image for printing may be retrieved from the storage device 7, a remote storage location 8, such as an online application, using the Internet, and/or a local area network. Furthermore, a graphical user interface 9 may be provided for allowing an operator to change or interact with the print system 1.

In an embodiment, a color separation that is performed in the printer pipeline may be optimized for a certain print attribute. The print attribute may comprise minimum ink usage. A color separation table 10 may be provided, comprising NPacs paired with certain color values. The NPacs may for example be optimized for a certain print attribute. The color separation table 10 may be stored in a print system driver, for example a printer driver 11. The storage device 7 may store the table 10. The table 10 may be stored in software running on the computing device 3, and/or on a remote storage location 8. In this description, amongst others, a method of setting up such table 10 will be described, wherein second NP area coverages may be incorporated, that may be obtained from a predetermined halftone data chart 12 containing predetermined pairs of halftone data and corresponding color values that are optimal for a certain print system 1.

Certain features of the print system 1 may influence an outgoing image color for a given color input value, for example an input RGB value. For example, a specific ink set 5, and/or substrate 4 may influence the actual printed color. Therefore, the color separation table 10 and the predetermined halftone data chart 12 may apply to a specific print system 1, for example for a specific combination of a printer 2, ink set 5 and/or substrate 4.

In an embodiment, at least one advantageous pre-determined pair of halftone data and a corresponding color value for the print system 1 may be available. The pair may be any arbitrary pair of halftone data and corresponding color value. For example, a chart 12 may be available that comprises multiple of such arbitrary halftone data and color value pairs. For example, such halftone patterns have shown to result in optimal ink usage for specific colors, or give better results for other print attributes such as smooth transitions between colors, low cost per copy, high color constancy, and low grain for the print system 1. To incorporate such advantageous pairs in the color separation table 10, NPacs may be derived from the halftone data, and linked to the corresponding color values.

The printing system 1 may employ an embodiment of a color separation interface and image processing system referred to as Halftone Area Neugebauer Separation (HANS), as described in U.S. patent application Ser. No. 12/390,214.

Figure 2:
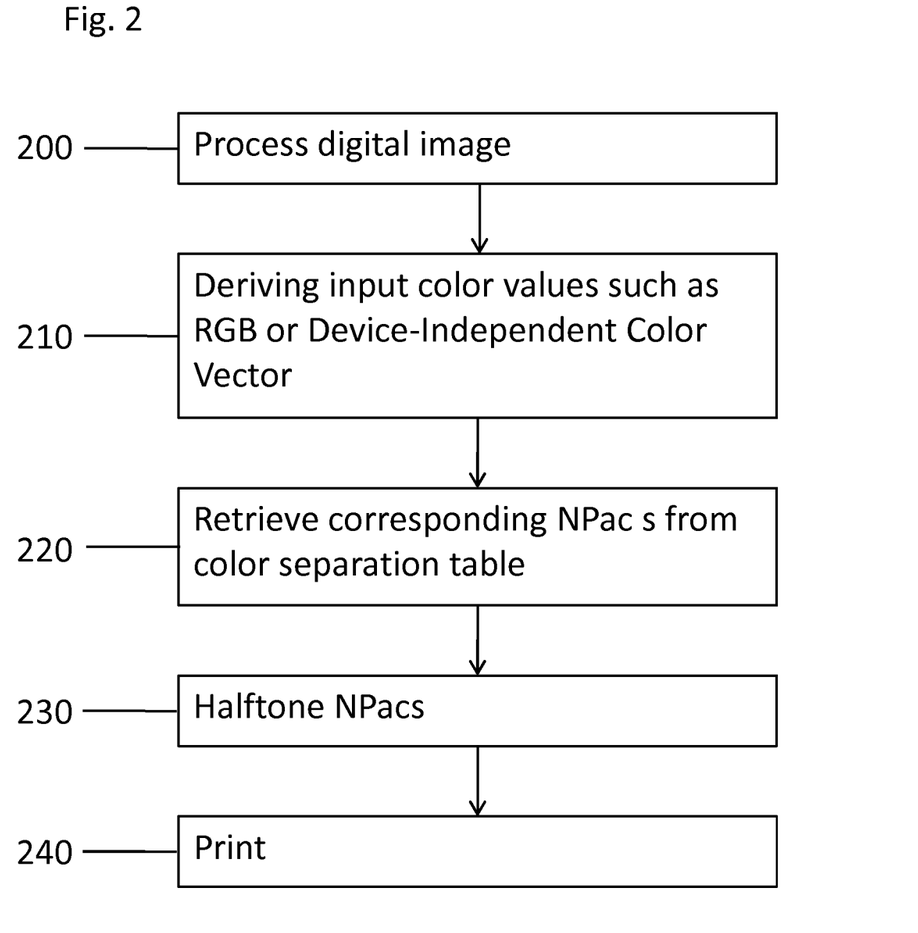
FIG. 2 shows a flow chart of a printing process using a color separation table.

FIG. 2 illustrates a color separation process and a halftoning process. In step 200, an image may be provided to the print system 1. For example the image may be received through a network or a data carrier. The image may be processed by the print system 1. For example, an input digital image may be transformed via its embedded ICC profile, and the printer's ICC profile, which may result in a continuous virtual device dependent RGB (Red, Green, and Blue) image or device independent CIE XYZ or CIE LAB values. Device independent values may be processed as input for step 220.

In an embodiment, in step 210, the device dependent RGB values may be received as an input. The received RGB image may be mapped to CIE XYZ so that the RGB cube bijects with the NPac's convex hull in the CIE XYZ color space.

In step 220, the system 1 may map each of the XYZs onto an NPac. The matching NPac may be retrieved from the color separation table 10. For example the table 10 may link NPacs to CIE XYZ values that are specific for the concerning print system 1, i.e. printer 2, ink set 5 and/or substrate 4. A part of the NPacs may have been converted from halftone data that was obtained from the chart 12, wherein the respective corresponding color values may for example have comprised CIE XYZ, or may have been converted from another color value to CIE XYZ.

The respective NPacs in the table 10 may be optimized for minimal ink usage and/or other print attributes such as, but not limited to, smooth transitions between colors, low cost per copy, color constancy and/or grain. The NPacs may also be incorporated into the color separations pipeline without being optimal in terms of some print attribute, whereby their choice may have other reasons.

The retrieved NPacs may then be communicated to a halftoning process in step 230. Halftoning may be used to define a spatial arrangement of the NPs specified in the input NPac vectors. For example, Vector Error Diffusion or Device State Error Diffusion (DSED) may be applied as a halftoning technique, wherein the NPs are its states and the error is diffused in the NPac space. Halftoning is a well known process. Halftoning in relation to NPacs is described in U.S. patent application Ser. No. 12/390,214.

An NPac may specify a certain distribution of NPs by corresponding relative area coverages, for each unit area. However, each pixel may only have one corresponding NP. For instance, if the printer 2 attempts to have 50% of a cyan NP and 50% of a magenta NP at a single pixel and the halftoning chooses to use the magenta NP at that pixel, there will be 50% too little of the cyan NP and 50% too much of the magenta NP, and an error will therefore be the result. In DSED, the difference between the desired NPac and the NP placed may be distributed or diffused using known error diffusion methods to one or more neighboring pixels. Example error diffusion methods include, but are not limited to, error randomization, serpentine processing, and the like.

In step 240, the input image may be printed as a hard copy having relatively low ink usage, smooth transitions between colors, low cost per copy, high color constancy and/or low grain with the full available gamut available.

Figure 3:
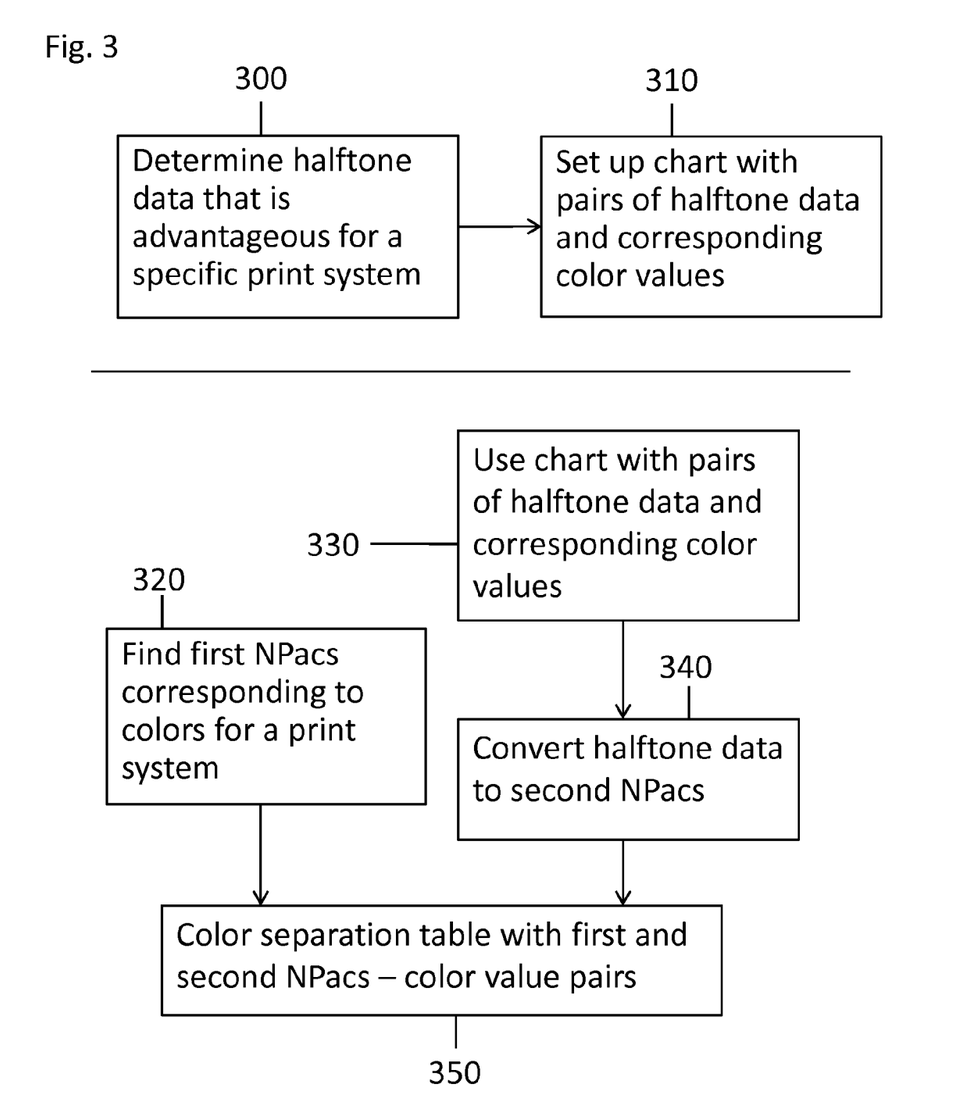
FIG. 3 shows a method of setting up a color separation table.

In FIG. 3, a method of setting up a color separation table 10 for a specific print system 1 is shown. The method may comprise two processes. A first process may comprise a known process and may be described with reference to step 300 and 310. This first process may comprise determining halftone data that may be advantageous for a print system 1 (step 300). This halftone data may have been derived from color patches or in another manner, and may be linked to the corresponding color value. Amongst others, the advantageous data may have been obtained systematically, incidentally and/or by trial and error. A chart 12 of pairs of predetermined halftone data and corresponding predetermined color values may be set up, as indicated by step 310. The chart 12 may be optimized for a specific print system 1.

A second process, as indicated by steps 320-350, may incorporate the above chart with optimal halftone data into the printer pipeline to get a better printed result. At least a part of the print system pipeline may be set up wherein first NPacs may be generated that correspond to certain color values specific for the print system 1. The first NPacs may be found, in step 320, for example by printing and measuring colors within ink limit NPs with the print system 1.

In step 330, the predetermined chart 12 may be used. The chart 12 may have been generated in abovementioned first process. From the chart 12, the pre-optimized halftone data may be converted to NPacs in step 340, so as to be able to add at least some of the optimized pairs, in the form of NPacs-color value pairs, to the pipeline.

In step 350, a color separation table 10 comprising first NPacs linked to corresponding color values may be generated. The pairs of second NPacs with corresponding color values, as obtained from the chart 12, may be assessed with respect to the first NPacs. The second NPacs that provide better results may be added to the table 10. For certain color values, the second NPacs may replace the first NPacs due to better results. For other color values the first NPacs may prevail, for example due to better results. In particular embodiments, after comparing second NPacs to first NPacs, the table 10 may only comprise first NPacs.

Figure 4:
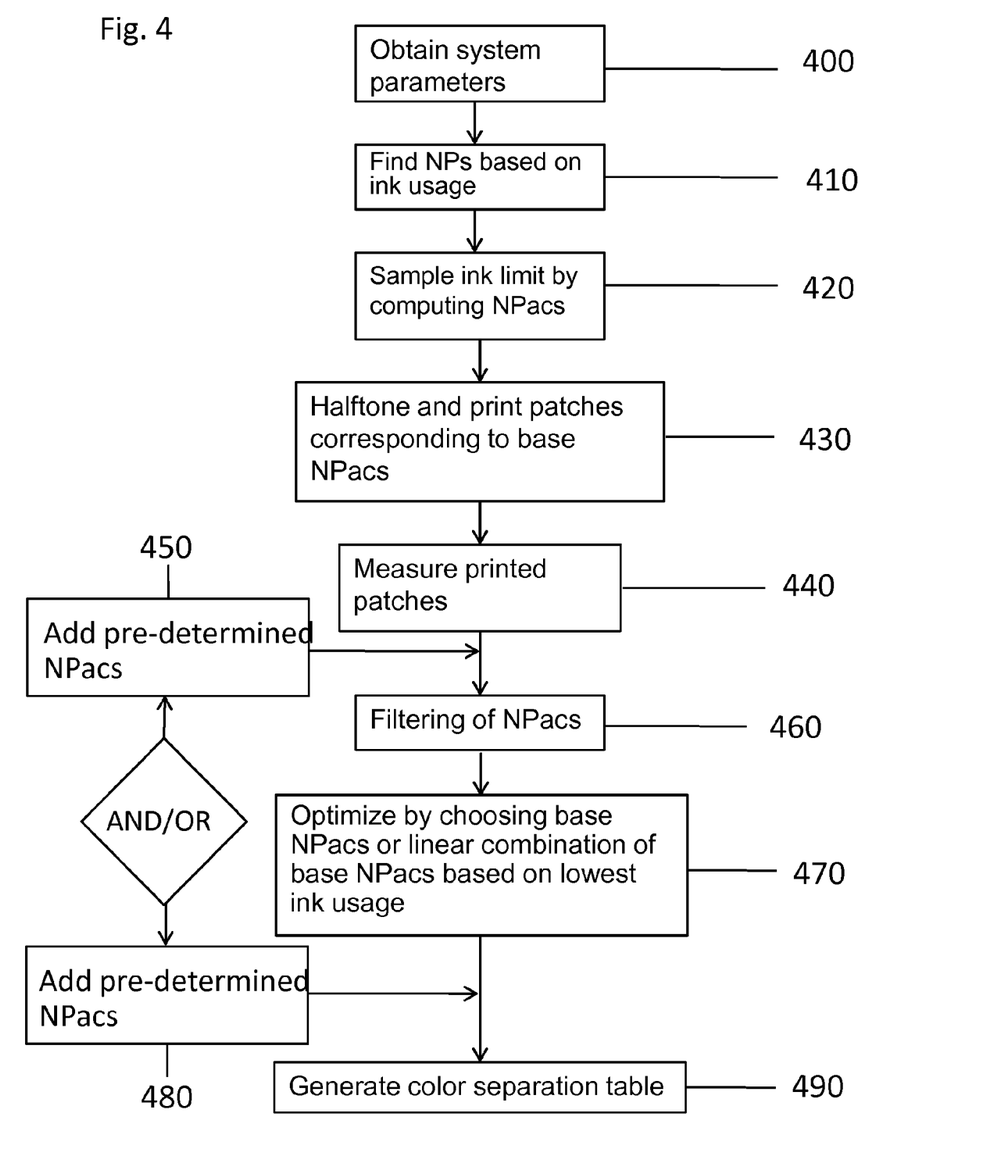
FIG. 4 shows a flow chart of a method of optimizing ink usage for a color.

Further embodiments of setting up a color separation table 10 may be described with respect to FIG. 4. In FIG. 4, a method is shown for obtaining a convex hull of NPacs in a predetermined color space. In the shown embodiment, the method outputs a table having optimized values for minimal ink usage for a predetermined print system 1. Also the second NPacs can be assessed in several ways, to the end of incorporating them in the color separation table 10.

In step 400, a number of system parameters may be obtained pertaining to a certain print system 1. The system parameters may include a number of inks (n), the weights of the inks per ink drop, the total ink limit per unit area, the maximum number of drops per ink per halftone pixel (k−1). Each of these parameters may depend on the type of ink set 5, substrate 4 and/or printer 2, or other hardware and/or software settings.

In a next step 410 a number of NPs may be selected based on ink usage. NPs may be selected that use no more, i.e. less than or the same as, a certain ink amount, for example based on the number of inks or ink drops per pixel or per surface area.

Figure 5:
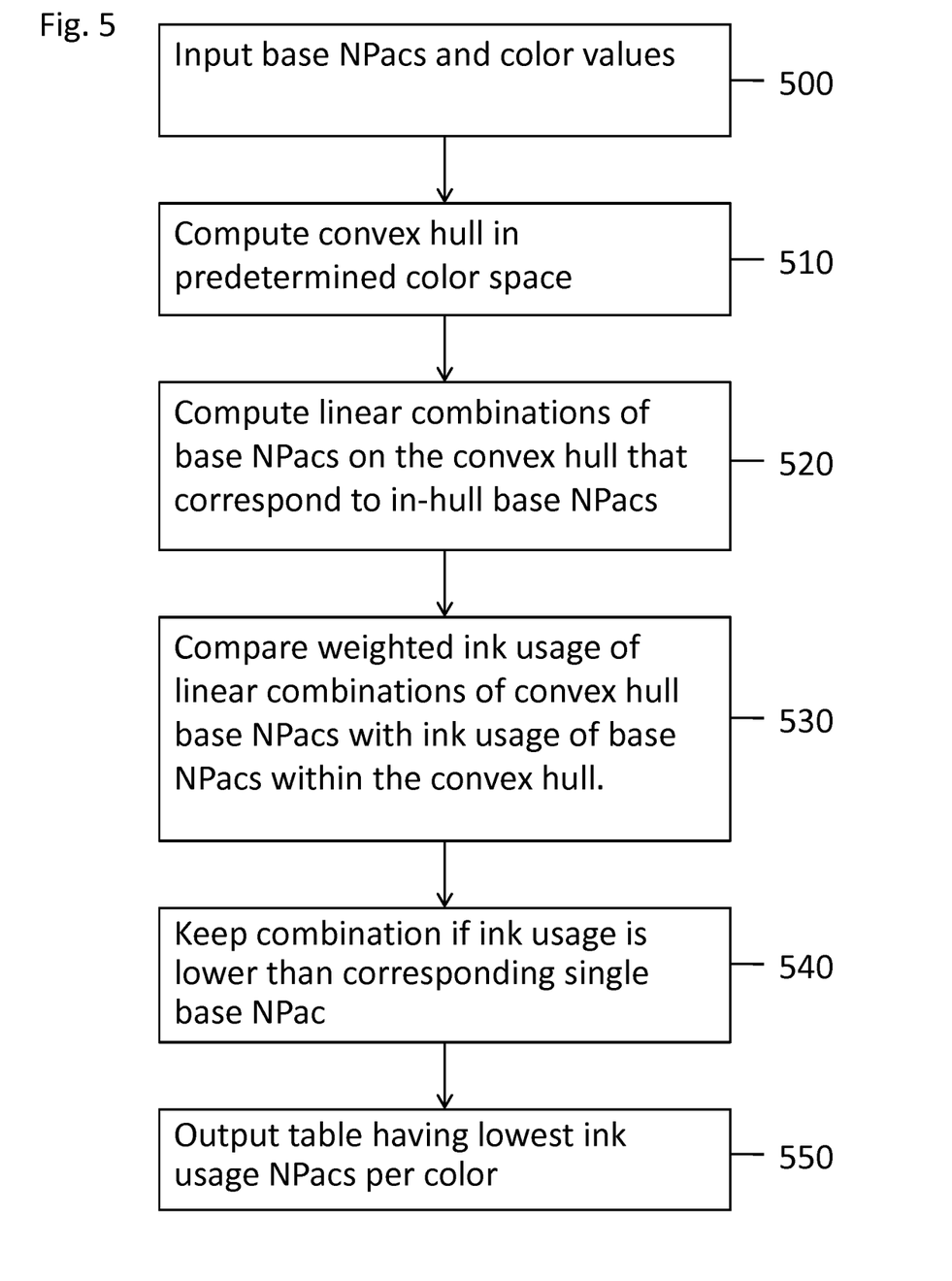
FIG. 5 shows a flow chart of a filtering method.

Among the initial $k^n$ NPs a number of NPs may be selected that use no more than a maximum number of inks. For example, NPs that use three inks or less may be selected. The applicable limit of number of inks may be determined experimentally. For example, the maximum number of inks may be determined by carrying out all the steps as set out below with reference to FIGS. 4 and/or 5. The ink limit may be determined without having an initial ink amount limit by determining which maximum number of NPs is left after carrying out the steps 400-490. This number may then be used.

An advantage of using fewer inks is that the number of NPs may be limited. This may make the process more efficient because fewer calculations may be needed. Also using a relatively high number of inks may be inefficient since a combination of many inks may tend to be relatively dark, in which case it may be more efficient to use black (K) ink instead of multiple other inks.

In addition to or instead of limiting the number of inks, NPs may be selected that do not exceed a maximum number of ink drops per halftone pixel. This may be done after selecting NPs based on the number of different inks as mentioned above. For example, in an embodiment the number of drops per pixel may not exceed five or six drops, in a case wherein an ink limit of a specific print system and/or substrate is three drops.

At another step 420, the ink limit may be sampled. NPs that initially fell outside the ink range in one of above steps may be linearly combined with one or more selected NPs that initially fell within the range. This may involve computing an NPac that uses a maximum amount of ink, in other words, that is on the ink limit, and that is a linear combination of an NP that fell outside of the selection and one or more selected NPs. For example, the ink limit NPacs may be computed using quadratic programming for the mapping on the ink limit, and Delaunay tessellation for the conversion to NPac.

The NPs that were selected in step 410, the NPacs that were selected in step 420, and/or any other selected NP or NPac, may be referred to as 'base NPacs'. Note that single NPs can be interpreted as single NP NPacs. The base NPacs may also comprise single NP NPacs.

In step 430, patches corresponding to the base NPacs, i.e. the selected NPs and NPacs, may be printed. The base NPacs may comprise first NPacs.

Note that the printing process for these patches may comprise a halftoning process. The input for the patches may comprise base NPacs, whereas the patches may be printed by choosing a certain NP per pixel. The choice of which NP to use for each pixel may for example be determined by DSED (Device State Error Diffusion) halftoning, wherein the error due to the difference between the respective NP and the actual NPac is diffused in the NPac space. The halftoning may generate an n-channel halftone that can be passed through the printer pipeline. Next to the halftoning step, the resulting patches' colors may be determined by the respective printer 2, inks and/or substrate 4. The remaining stages that need to be taken before actual printing may be the same as currently applied, for example involving masking, amongst others.

In step 440, the printed patches may be measured, so as to be able to pair the colors of the respective print system 1 with respect to corresponding base NPacs.

In this description, a first and second NPacs may be obtained in different manners. The second NPacs may comprise NPacs that were obtained from the predetermined chart 12, while the first NPacs may have been obtained in another manner, for example by finding NPacs that may be optimized for a certain print attribute.

At this stage, second NPacs, as derived from the chart 12, may be introduced, as indicated by step 450. The second NPacs may be added to the first NPacs. The base NPacs then comprise both first and second NPacs. In the following steps the base NPacs that are closest to the reference print attribute value for a corresponding color value may be selected, wherein both the first and second NPacs may be taken into account.

Optionally a filtering step may be applied to the selected base NPacs, as indicated by step 460. Filtering may limit the number of base NPacs that can be combined in optimization step 470. This filtering step 460 may limit computing time. A method of filtering is described below with reference to FIG. 5.

In optimization step 470, linear combinations of base NPacs may be computed, which base NPacs form vertices of polyhedra around corresponding single base NP area coverages, wherein the weighted linear combination of base NPacs and the corresponding single base NPac correspond to the same color. For the corresponding color, it may be determined which one of the base NPac and the linear combination of base NPacs uses the least ink. Then, the one using the least ink may be assigned to the respective color.

In step 480, the second NPacs may be added to the first NPacs. The second NPacs may be added to the first NPacs after filtering. The second NPacs and their corresponding input color values may be directly incorporated in the color separation table 10 in step 490, without filtering the second NPacs. These NPacs may be added to the table 10 without going through a filtering step. One of, or both, steps 450 and 480 may be carried out for setting up the table 10. For example, a first selection of second NPacs may be directly incorporated into the table 10, while a second selection of second NPacs may be incorporated to the set of base NPacs so as to be filtered, in step 450. Both steps 450 and 480 may have an advantageous outcome due to the inherent convexity of the color space that is achieved when processing the steps 400-480. For example, it may be advantageous to filter the second NPacs together with the first NPacs, with reference to step 450 and 460, when it is not known if the chart 12 comprises optimized color data. It may be advantageous to add the second NPacs directly to the table 10, if the chart 12 comprises optimized color data.

In step 490, a color separation table may be generated, containing for each color an NPac that may be optimized for minimum ink usage or for another print attribute. Together, the colors in the table 10 may form a convex hull in a color space. Multiple color separation tables 10 may be generated for multiple different print systems 1. Thereafter the table 10 may be used by a printer operator or print system 1. Depending on its use, a color separation table 10 may be provided in any suitable manner. The table 10 may comprise second NPacs.

In one embodiment, the second NPacs may be added to the table 10, next to other selected base NPacs. In another embodiment, second NPacs may replace respective base NPacs corresponding to the same or approximately the same color value.

The preceding steps 400-490 may be repeated for multiple different print systems 1. For example, the steps 400-490 may be repeated for multiple different printers 2, multiple different ink sets 5, and/or multiple different substrates 4, and/or different combinations thereof. Between different print systems 1, a calculated base NPac (or linear combination of base NPacs) may be different for a predetermined color, because a different feature in the print system 1 may influence printed color properties. The vertex base NPacs in the linear combination each have a weight assigned to them, wherein the weights may be used as the area coverages of the resulting NPac.

In FIG. 5, a method of filtering base NPacs is shown. A part of this method may be inserted into step 460 of FIG. 4. The method may limit the number of base NPacs for which linear combinations of its vertices are computed. The filtering method may prevent that for every base NPac linear combinations are calculated and therefore limit the amount of time needed to calculate optimized NPacs while maintaining an optimized result.

In step 500, the base NPacs may be processed as input for the filtering step and optimization. In one embodiment, the base NPacs contain merely first NPacs, wherein the second NPacs are added after optimization. In another embodiment, the base NPacs comprise first and second NPacs.

In step 510, a convex hull of the color values may be computed, in a certain color space. The computation may comprise computing which base NPacs form the convex hull in a certain color space. For example, the convex hull may be computed in the CIE XYZ space, or a transformation of the CIE XYZ space that results in a more accurate printer model, such as, but not limited to a Yule-Nielsen n-exponent transformation to XYZ$^n$.

In a further step 520, linear combinations of base NPacs on the convex hull are computed that correspond to the same color as respective base NPacs within the convex hull. Base NPacs on the convex hull are used that form the vertices of polyhedra of respective base NPacs within the convex hull, and correspond to the same color as the respective base NPac within the convex hull. The barycentric coordinates of the vertices correspond to the weights of each of the combined base NPacs. The total ink usage may be calculated by adding up each weighted ink usage.

Using merely convex hull base NPacs for computing linear combinations filters out computation of many other possible linear combinations of base NPacs within the convex hull. This saves computer memory usage as well as computing time. By going through the base NPacs that form the convex hull, i.e. the outer 'shell' of the convex hull, to form the linear combinations, no color gamut will be lost in this step.

In step 530, the combined, weighted ink usage of each of the linear combinations of convex hull base NPacs may be compared with the ink usage of its corresponding base NPac within the hull. In step 540, the linear combinations may be kept if the weighted ink usage is less than the ink usage of the corresponding base NPac within the convex hull. Vice versa, the base NPac within the convex hull may be kept if its ink usage is lower than that of the corresponding linear combination.

In step 550, a color separation table 10 may be generated, wherein an optimized NPac is assigned to each color on the convex hull, in a certain color space, as described with reference to FIG. 4.

In the above, reference is made to minimized ink usage. However above methods may also be applied for other print attributes, such as, but not limited to, grain and/or color constancy, wherein the NPacs may be optimized according to those other print attributes.

In a first aspect, a method of setting up a color separation table for a specific print system may be provided, which may comprise (i) finding first NPacs of a specific print system that correspond to color values, (ii) adding second NPacs by converting halftone data from at least one pre-determined pair of halftone data and corresponding color value to NPacs, and (iii) generating a color separation table arranged as input for a halftone process that comprises color values linked to the corresponding first and second NPacs.

In this description, base NPacs may be selected that have print attribute values in the print attribute value range. NPacs that fall outside of the range may be disregarded. A possible method is selecting NPs based on the respective at least one print attribute, and/or mapping NPacs on the ink limit, as explained above. In an illustrative example, the print attribute may be ink usage, the reference print attribute value may be 0, corresponding to an ink usage as low as possible, and the print attribute range may be between 0 and 40 nanograms per pixel, and/or between 0 and 5 inks per halftone pixel. It may be the aim to reach the reference print attribute value as close as possible. The reference print attribute value may comprise a minimum or maximum value, defining a limit of the print attribute range, but it may also be somewhere between the ends of the print attribute range, for example approximately in the middle of the range. The value may comprise a grain value or a color constancy value.

Patches of the base NPacs may be printed and measured, so as to be able to assign NPacs to a corresponding color in a color space.

Linear combinations of the base NPacs may be computed, and one of (i) the base NPac or (ii) the linear combination of base NPacs may be assigned to the corresponding color, by verifying which of (i) the base NPac and (ii) the linear combination of base NPacs is closest to the reference print attribute value. For example, if a linear combination of base NPacs has more color constancy, less grain, or uses less ink, than a single base NPac having the same color, the linear combination of base NPacs may replace the single base NPac.

In a filtering step, a weighted print attribute value of linear combinations of the base NPacs that are situated on the convex hull may be compared to the print attribute value of the corresponding single base NPac inside the convex hull, wherein the linear combination of base NPacs and the corresponding single base NPacs have the same color. Computing linear combinations of other base NPacs, i.e. NPacs that are not on the convex hull, may be left out of this computing step, saving significant computing time. Some of the single base NPacs inside the convex hull may be kept if they have a print attribute value that is closer to the reference print attribute value than the weighted print attribute value of the respective corresponding linear combinations of base NPacs on the convex hull. If the weighted print attribute value of the linear combination of NPacs is closer to the reference print attribute value than the print attribute value of the corresponding base NPac, than the combination may be kept.

In a second aspect, a computer program product may be provided, which may comprise (i) a color separation table 10 containing NPacs associated to a print attribute for a given print system 1 and color values corresponding to each of the NPacs, wherein at least one of the NPacs is derived from a pre-determined pair of halftone data and a corresponding color value, (ii) instructions, that when executed on a processing circuit instruct a processing circuit to perform a method comprising: (i) deriving one or more input color values from an image, (ii) selecting one or more NPacs from the table 10 corresponding to the one or more input color values, and (iii) communicating the one or more NPacs to a halftoning process.

The computer program product may comprise, but is not limited to, software, drivers, and/or data saved on a storage device or data carrier.

Accordingly, a method of facilitating low ink usage for a color may be provided, which may comprise (i) providing a table 10 containing NPacs associated to a minimum ink usage for a given print system 1, and color values corresponding to each of the NPacs, (ii) deriving one or more input color values from an image, (iii) selecting one or more NPacs from the table 10 corresponding to the one or more input color values, and (iv) communicating the one or more NPacs to a halftoning process.

According to an additional aspect, a print system 1 may be provided, that may comprise (i) a chart 12 comprising predetermined halftone data corresponding to a color value that is pre-optimized for at least one print attribute of the print system 1, (ii) a storage device 7 having stored thereon a color separation table 10 with NPacs corresponding to predetermined color values available on the print system 1, the NPacs being optimized for said print attribute and including at least one NPac corresponding to the predetermined halftone data, and (iii) a processing circuit arranged to communicate the NPacs in the color separation table 10 to a halftone process.

As will be understood by the skilled person, in the above description and in the claims, the term "optimizing", or conjugations thereof, should be understood as an act of improving or trying to reach an optimum by performing certain steps. It should not be understood as an act of reaching an undisputable optimal solution.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

The mere fact that certain measures are recited in mutually different dependent claims does not indicate that a combination of these measures cannot be used to advantage. Multiple alternatives, equivalents, variations and combinations may be made without departing from the scope of the invention.

What is claimed is:

1. A method of setting up a color separation table for a specific print system, the method comprising:
    finding first NPacs (Neugebauer Primary Area Coverages) of a specific print system that correspond to color values, at least one of the NPacs including contributions from plural NPs (Neugebauer Primaries), wherein the finding of first NPacs includes
        determining a print attribute value range pertaining to a reference print attribute value, and
        selecting base NPacs, including NPacs representing single NPs and combined NPs, that have print attribute values in the print attribute value range;
    obtaining second NP area coverages by converting halftone data from at least one pre-determined pair of halftone data and corresponding color value to NPacs, the halftone data including halftone patterns associated with colors;
    generating, by a computer, a color separation table arranged as input for a halftone process that includes color values linked to the corresponding at least some of the first and at least some of the second NPacs;
    including the second NPacs with the first NPacs to constitute base NPacs;
    selecting the base NPacs that are closest to the reference print attribute value for a corresponding color value;
    optimizing NPacs by computing linear combinations of the base NPacs, wherein the computing of linear combinations of the base NPacs includes,
        computing a convex hull of colors measured from patches in a predetermined color space,
        determining the NPacs corresponding to the colors forming the convex hull,
        comparing a weighted print attribute value of a linear combination of base NPacs on the convex hull to a print attribute value of a base NPac inside the convex hull having a corresponding color,
        keeping the base NPac inside the convex hull only if it has a print attribute value that is closer to the reference print attribute value than the weighted print attribute value of the linear combination of base NPacs on the convex hull, and
    assigning one of the base NPacs or the linear combination of base NPacs to a corresponding color value, depending on which is closest to the reference print attribute value.

2. A method as recited in claim 1 comprising incorporating the second NPacs and corresponding color values directly into the color separation table.

3. A method as recited in claim 2, further comprising replacing an optimized NPac linked to a certain color value by a second NPac linked to an approximately corresponding color value.

4. A method as recited in claim 1, wherein the at least one pre-determined pair of halftone data and corresponding color value is included in a chart with colored patches.

5. A system comprising non-transitory media encoded with code defining a color-separation pipeline to convert colors to halftone patterns in a print system defining NPs (Neugebauer Primaries), the NPs including included NPs and excluded NPs, the pipeline including a color separation table associating colors with base NPacs (Neugebauer Primary Area Coverages) including single-NP (Neugebauer Primary) NPacs corresponding to said included NPs and multi-NP NPacs, said color separation table excluding said excluded NPs, at least one of the base NPacs being a linear combination of NPs including at least one excluded NP, the base NPacs being on of within a convex hull in a color space, the excluded NPs not being on or within the convex hull, the color-separation pipeline being to, when executed by a processor, convert colors not represented in the color-separation table as linear combinations of the base NPacs.

6. A system as recited in claim 5 wherein the color separation table excludes the excluded NPs and at least one of the hull NPacs is a combination of at least one included NP and at least one excluded NP.

7. A method comprising:
    identifying, using a computer, included and excluded Neugebauer Primaries (NPs) of a print system, said included Neugebauer Primaries meeting a criterion, said excluded Neugebauer Primaries not meeting said criterion;
    computing, using said computer, proxy Neugebauer Primary Area Coverage Vectors (NPacs) meeting said criterion, each proxy NPac being a linear combination of NPs including at least one excluded NP and at least one included NP, the base NPacs being on of within a convex hull in a color space, the excluded NPs not being on or within the convex hull; and generating, using said computer, a color separation table excluding said excluded NPs and including at least one of said included NPs and at least one of said proxy NPacs.

8. A method as recited in claim 7 wherein said generating is so that said color separation table includes NPacs not resulting from said computing that were determined to be optimized for producing certain colors on said print system.

9. A computer-program product comprising non-transitory computer-readable media encoded with code that, when executed by a processor, causes the processor to implement the method of claim 8.

10. A method as recited in claim 7 including computing combination NPacs for colors not directly represented in said color separation table as linear combinations of said included NPs and said proxy NPacs.

11. A computer-program product comprising non-transitory computer-readable media encoded with code that, when executed by a processor, causes the processor to implement the method of claim 10.

12. A computer-program product comprising non-transitory computer-readable media encoded with code that, when executed by a processor, causes the processor to implement the method of claim 7.

13. A computer-program product comprising non-transitory media encoded with code that, when executed by a processor, causes the processor to implement a method including:
    finding first NPacs (Neugebauer Primary Area Coverages) of a specific print system that correspond to color values, at least one of the NPacs including contributions from plural NPs (Neugebauer Primaries), wherein the finding of first NPacs includes
        determining a print attribute value range pertaining to a reference print attribute value, and selecting base NPacs, including NPacs representing single NPs and combined NPs, that have print attribute values in the print attribute value range;
obtaining second NP area coverages by converting halftone data from at least one pre-determined pair of halftone data and corresponding color value to NPacs, the halftone data including halftone patterns associated with colors;
generating, by a computer, a color separation table arranged as input for a halftone process that includes color values linked to the corresponding at least some of the first and at least some of the second NPacs;
including the second NPacs with the first NPacs to constitute base NPacs;
selecting the base NPacs that are closest to the reference print attribute value for a corresponding color value;
optimizing NPacs by computing linear combinations of the base NPacs, wherein the computing of linear combinations of the base NPacs includes,
computing a convex hull of colors measured from patches in a predetermined color space,
determining the NPacs corresponding to the colors forming the convex hull,
comparing a weighted print attribute value of a linear combination of base NPacs on the convex hull to a print attribute value of a base NPac inside the convex hull having a corresponding color,
keeping the base NPac inside the convex hull only if it has a print attribute value that is closer to the reference print attribute value than the weighted print attribute value of the linear combination of base NPacs on the convex hull, and
assigning one of the base NPacs or the linear combination of base NPacs to a corresponding color value, depending on which is closest to the reference print attribute value.

14. A computer-program product as recited in claim 13 wherein the method further includes incorporating the second NPacs and corresponding color values directly into the color separation table.

15. A computer-program product as recited in claim 14 wherein the method further includes replacing an optimized NPac linked to a certain color value by a second NPac linked to an approximately corresponding color value.

16. A computer-program product as recited in claim 13 wherein the at least one pre-determined pair of halftone data and corresponding color value is included in a chart with colored patches.

* * * * *

UNITED STATES PATENT AND TRADEMARK OFFICE
CERTIFICATE OF CORRECTION

PATENT NO. : 9,584,700 B2  
APPLICATION NO. : 12/605499  
DATED : February 28, 2017  
INVENTOR(S) : Jan Morovic et al.

Page 1 of 1

It is certified that error appears in the above-identified patent and that said Letters Patent is hereby corrected as shown below:

In the Claims

In Column 11, Line 59, in Claim 3, delete "claim 2," and insert -- claim 6 --, therefor.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*